United States Patent
Sasaki

(10) Patent No.: US 8,982,389 B2
(45) Date of Patent: Mar. 17, 2015

(54) IMAGE PROCESSING APPARATUS, SCREEN DATA PROVIDING METHOD, AND COMPUTER-READABLE RECORDING MEDIUM

(71) Applicant: Tohru Sasaki, Kanagawa (JP)

(72) Inventor: Tohru Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/906,613

(22) Filed: May 31, 2013

(65) Prior Publication Data

US 2013/0329253 A1 Dec. 12, 2013

(30) Foreign Application Priority Data

Jun. 12, 2012 (JP) ................. 2012-133231

(51) Int. Cl.
G06K 15/00 (2006.01)
G06F 3/12 (2006.01)
H04N 1/00 (2006.01)

(52) U.S. Cl.
CPC ......... *H04N 1/0035* (2013.01); *H04N 1/00127* (2013.01); *H04N 1/00222* (2013.01); *H04N 1/00408* (2013.01); *H04N 1/00474* (2013.01); *H04N 1/00482* (2013.01); *H04N 2201/001* (2013.01); *H04N 2201/0055* (2013.01); *H04N 2201/0072* (2013.01); *H04N 2201/0094* (2013.01)
USPC .......... 358/1.15; 358/1.14; 358/1.16; 358/1.6

(58) Field of Classification Search
USPC .............. 358/1.15, 1.6, 3.24, 1.14, 1.16, 501, 358/508, 401, 476; 455/41.3, 3.01, 3.03, 455/3.05, 403, 408, 426.2, 456.1, 456.2, 455/421, 420, 414.3, 414.2, 414.1, 566, 91, 455/95, 115.3, 9, 41.2, 74.1, 556.2; 710/8, 710/9, 1, 43; 715/200, 222, 274, 273, 700, 715/705, 716, 726, 734, 738, 740, 746, 749, 715/751, 762, 769, 809
See application file for complete search history.

(56) References Cited

U.S. PATENT DOCUMENTS

2009/0033984 A1* 2/2009 Sahashi .................. 358/1.15
2010/0069008 A1* 3/2010 Oshima et al. ............. 455/41.3

FOREIGN PATENT DOCUMENTS

| JP | 2002-149470 | 5/2002 |
| JP | 2006-195765 | 7/2006 |
| JP | 2007-290324 | 11/2007 |
| JP | 2009-055580 | 3/2009 |

* cited by examiner

*Primary Examiner* — Ngon Nguyen
(74) *Attorney, Agent, or Firm* — IPUSA, PLLC

(57) ABSTRACT

An image processing apparatus for executing a job set thereto, and includes a communication unit configured to perform wireless communication with a portable terminal, a distance estimation unit configured to estimate a distance between the image processing apparatus and the portable terminal, a screen determination unit configured to determine a screen to be displayed on the portable terminal according to the distance estimated by the distance estimation unit, a screen configuration data generation unit configured to generate a first screen configuration data that constitute the screen determined by the screen determination unit, and a job execution control unit configured to control execution of the job based on a setting condition received from the portable terminal via the communication unit.

9 Claims, 15 Drawing Sheets

FIG.5A

| USER ID | PASSWORD |
|---|---|
| 123 | **** |
| 124 | **** |
| 125 | **** |
| 126 | **** |

| USER ID | SHORT DISTANCE | LONG DISTANCE | SETTING CONTENT (SHORT DISTANCE) | SETTING CONTENT (LONG DISTANCE) |
|---|---|---|---|---|
| 123 | COPIER SCREEN | STATUS SCREEN | /123/SHORT DISTANCE/ | /123/LONG DISTANCE/ |
| 124 | COPIER SCREEN | SYSTEM STATUS SCREEN | /124/SHORT DISTANCE/ | /124/LONG DISTANCE/ |
| 125 | APPLICATION SELECTION SCREEN | STATUS SCREEN | /125/SHORT DISTANCE/ | /125/LONG DISTANCE/ |
| 126 | APPLICATION SELECTION SCREEN | SYSTEM STATUS SCREEN | /126/SHORT DISTANCE/ | /126/LONG DISTANCE/ |

IMAGE PROCESSING APPARATUS, SCREEN DATA PROVIDING METHOD, AND COMPUTER-READABLE RECORDING MEDIUM

BACKGROUND OF THE INVENTION

1. Field of the Invention

The present invention relates to an image processing apparatus for executing jobs that are set.

2. Description of the Related Art

An image forming apparatus (e.g., printer, copier) often includes an operation panel and has a communication function for communicating with a terminal(s) via a network. The user can instruct jobs to be executed via the control panel, obtain data of the status of the image forming apparatus (e.g., amount of remaining toner) from a terminal, and allow the data to be displayed on the terminal.

Because data to be displayed as a default on an application screen (e.g., copy, document, printer, transmission) of the control panel differs depending on the user, users or administrators may desire to set the application screen of the control panel beforehand, so that the application screen displayed on the control panel is customized for each user or administrator. In response to such desire, there is a known image forming apparatus enabling an initial display screen to be set by users and administrators, so that the initial display screen is customized for each user. The image forming apparatus has a UI customizing function that enables each user to set an initial display screen when logging in to the image forming apparatus.

As a terminal that allows a user to operate an image forming apparatus from a distant area, portable terminals (e.g., smart phones and tablets) are widely used in addition to personal computers (PCs). Thus, there is a known method for providing position data of an image forming apparatus, so that the user of a portable terminal can easily find the image forming apparatus (see, for example, Japanese Laid-Open Patent Publication No. 2006-195765). Japanese Laid-Open Patent Publication No. 2006-195765 discloses a position confirmation printer system in which: a portable terminal transmits position data to a network server; then, the network server uses a map data searching and a printer position data searching unit to generate a list of locations of printers near the portable terminal (in an order starting from the printer nearest to the portable terminal) based on the transmitted position data; and then, the network server transmits the list to the portable terminal.

However, with the image forming apparatus according to a related art, the user is required to control the image forming apparatus by using a PC or a portable terminal in a case of operating from a distant area whereas the user is required to operate on an operation panel installed in the image forming apparatus in a case of instructing execution of a job. Thus, the user is required to adaptively use separate different operation devices depending on the situation of using the image forming apparatus.

For example, the user is required to operate on an application screen (desired by the user) displayed on a control panel in a case of instructing execution of a job to the image forming apparatus whereas the user is required to view a screen of a terminal and operate on the terminal in a case of operating the image forming apparatus.

Although the user can use the operation panel of the image forming apparatus to perform both instructing of execution of a job and confirming some of the statuses of the image forming apparatus, it is necessary for the user to switch between a job execution screen and a status confirmation screen by operating on the operation panel. However, this leads to problems such as increase in the number of steps required to perform a given operation and increase of the difficulty of operating the operation panel. From this aspect, it may be advantageous to separately operate an operation device and the operation panel of the image forming apparatus depending on usage. Thereby, the user can quickly find a desired function or screen by adaptively using both the control panel and the terminal.

SUMMARY OF THE INVENTION

The present invention may provide an image processing apparatus, a screen data providing method, and a computer-readable recording medium that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image processing apparatus, system, and method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image processing apparatus for executing a job set thereto, the image processing apparatus including: a communication unit configured to perform wireless communication with a portable terminal; a distance estimation unit configured to estimate a distance between the image processing apparatus and the portable terminal; a screen determination unit configured to determine a screen to be displayed on the portable terminal according to the distance estimated by the distance estimation unit; a screen configuration data generation unit configured to generate a first screen configuration data that constitute the screen determined by the screen determination unit; and a job execution control unit configured to control execution of the job based on a setting condition received from the portable terminal via the communication unit.

Other objects, features and advantages of the present invention will become more apparent from the following detailed description when read in conjunction with the accompanying drawings.

BRIEF DESCRIPTION OF THE DRAWINGS

FIG. 5A is a schematic diagram illustrating an example of user data according to an embodiment of the present invention;

FIG. 5B is a schematic diagram illustrating an example of a screen determination table according to an embodiment of the present invention;

DETAILED DESCRIPTION OF THE PREFERRED EMBODIMENTS

Embodiments of the present invention are described with reference to the accompanying drawings.

Figure 1:
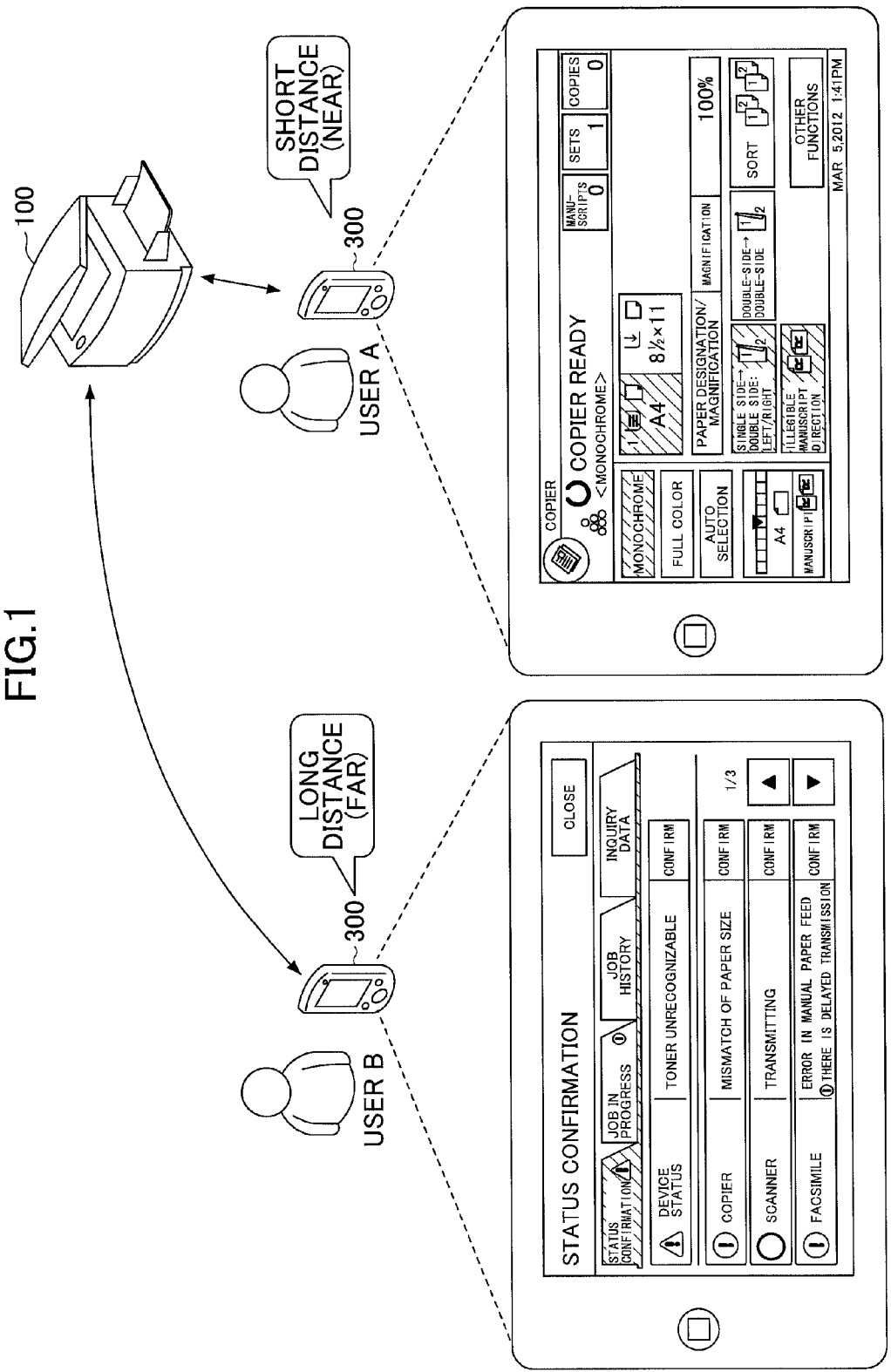
FIG. 1 is a schematic diagram for describing features of an image forming apparatus according to an embodiment of the present invention.

FIG. 1 is a schematic diagram for describing features of an image forming apparatus 100 according to an embodiment of the present invention. The image forming apparatus 100 is one example of an image processing apparatus. In this embodiment, a user carries a portable terminal (mobile terminal) 300 that can perform wireless communications with the image forming apparatus 100.

In a case where the user operates the image forming apparatus 100 by using the portable terminal 300, the image forming apparatus 100 measures its distance between the portable terminal 300. Alternatively, the portable terminal 300 may measure its distance between the image forming apparatus 100. In the example of FIG. 1, a user A is positioned near the image forming apparatus whereas a user B is positioned far from the image forming apparatus 100.

The image forming apparatus 100 controls the screen to be displayed on the portable terminal 300 in accordance with its distance between the portable terminal 300.

The screen to be displayed on the portable terminal 300 of the user A (near) is a job execution screen (screen used for executing a job). In the example of FIG. 1, a copier screen is displayed on the portable terminal 300 of the user A. The screen to be displayed on the portable terminal 300 of the user B (far) is a system status screen.

Because the probability of execution of a job is high for the user A positioned near the image forming apparatus 100, the image forming apparatus 100 transmits, for example, data of the job execution screen (e.g., copier screen in the example of FIG. 1) to the portable terminal 300 of the user A, so that the user A can immediately use a desired function of the image forming apparatus 100. On the other hand, because the probability of execution of a job is low for the user B positioned far from the image forming apparatus 100, the image forming apparatus 100 transmits, for example, data of the system status screen to the portable terminal 300 of the user B, so that the user can achieve a desired purpose with only a small number of operations (maneuvers).

By controlling the screen in accordance with the distance between the image forming apparatus 100 and the portable terminal 300, operations can be performed on the image forming apparatus 100 by using a single portable terminal 300 regardless of the situation/usage of the user and without complicating the system for operating the image forming apparatus 100. That is, by controlling the screen of the portable terminal 300 in accordance with the distance between the image forming apparatus 100 and the portable terminal 300, there is no need for the user to operate on an operation panel 13 or the like of the image forming apparatus 100. Further, the number of operations (maneuvers) required and the time for performing the operations can be reduced because the situation to be used can be predicted (anticipated) according to the distance between the image forming apparatus 100 and the portable terminal 300.

Configuration

Figure 2:
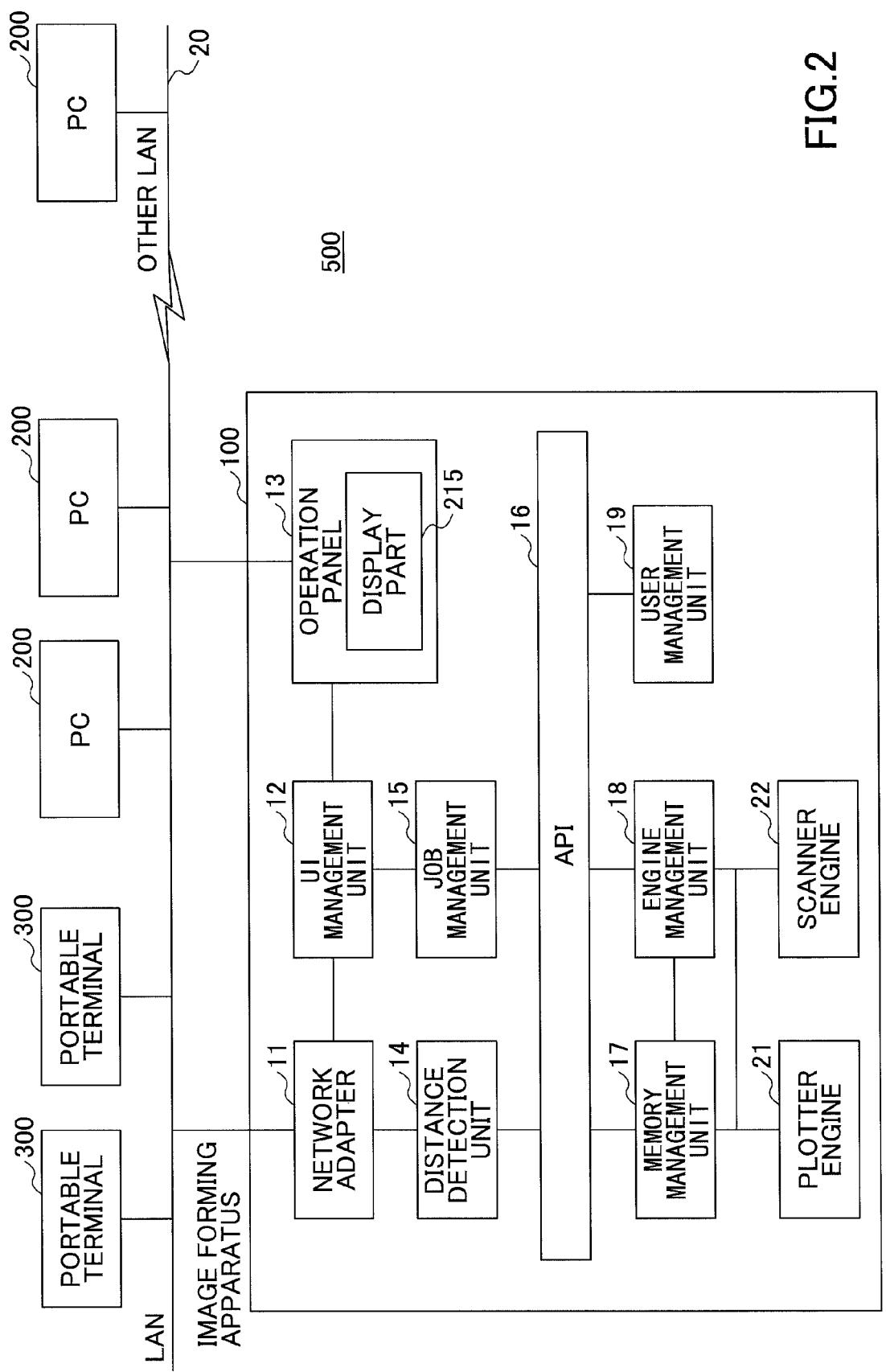
FIG. 2 is a schematic diagram illustrating an example of a configuration of a communication system according to an embodiment of the present invention.

FIG. 2 is a schematic diagram illustrating an example of a configuration of a communication system 500 according to an embodiment of the present invention. The communication system 500 includes the portable terminal 300, the image forming apparatus 100, and a personal computer (PC) 200, that are connected to each other via a network 20. The portable terminal 300 may be any type of data processing apparatus that can operate the image forming apparatus 100 via the network 20. For example, the portable terminal 300 may be a smart phone, a tablet, a straight PC terminal, a notebook PC, a portable phone, or a PDA (Personal Digital Assistant). The portable terminal 300 communicates with the image forming apparatus 100 by way of, for example, a wireless LAN (Local Area Network), Bluetooth (Registered Trademark), or IC (Integrated Circuit) communication.

The PC 200 is also a data processing apparatus that can operate the image forming apparatus 100 via the network 20. In this embodiment, the PC 200 is mainly a desktop computer but may also be a portable type PC such as a notebook PC, or tablet PC. The PC 200 also communicates with the image forming apparatus 100 by way of, for example, a wireless or a cable (wired) LAN (Local Area Network).

The network 20 is mainly a single LAN but may be constituted by a plurality of LANs (sub networks) connected by one or more routers. In a case where the network 20 is constituted by the plurality of LANs, the network 20 may be connected to the Internet. For example, in a case of performing one on one communication, the communication may be performed via the network 20.

The image forming apparatus 100 is an apparatus that includes one or more functions of, for example, a printer, a copier, a scanner, or a facsimile. That is, the image forming apparatus 100 includes at least one of, for example, a printer function, a copier function, a scanner function, a document box function, a transmission function (e.g., facsimile transmission function, a scan-to-email function). The image forming apparatus 100 may also be referred to as a MFP (Multifunction Peripheral).

Figure 3:
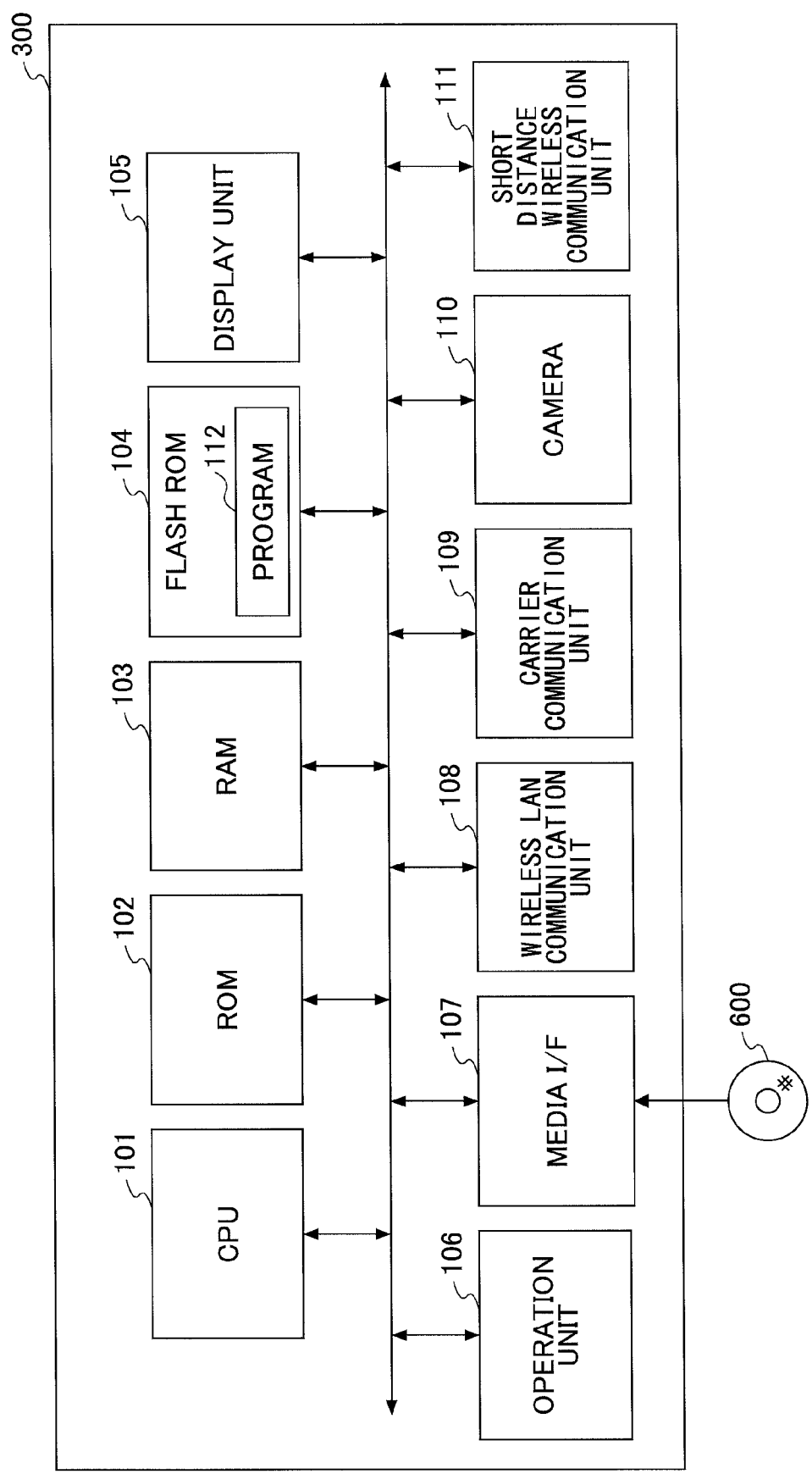
FIG. 3 is a schematic diagram illustrating an example of a hardware configuration of the portable terminal according to an embodiment of the present invention.

FIG. 3 is a schematic diagram illustrating an example of a hardware configuration of the portable terminal 300 according to an embodiment of the present invention. The portable terminal 300 includes a wireless LAN communication unit 108 for connecting to a wireless LAN, a short distance wireless communication unit 111 (e.g., Bluetooth (registered trademark)), and a carrier communication unit 109. Alternatively, the carrier communication unit 109 may be omitted from the hardware configuration of the portable terminal 300. The carrier communication unit 109 also includes a CPU (Central Processing Unit) 101, a ROM (Read Only Memory) 102, a RAM (Random Access Memory) 103, a flash ROM 104, a display unit 105, an operation unit 106, a media I/F unit 107, and a cameral 110.

The CPU 101 controls the overall operations of the portable terminal 300 by executing a program(s) 11 stored in the flash ROM 104. The ROM 102 stores, for example, an IPL (Initial Program Loader) and static data therein. The RAM 103 is used as a work area when the CPU 101 executes the program 112.

The flash ROM 104 stores the program(s) 112 to be executed by the CPU 101. The program(s) 112 includes, for example, an OS ((Operating System), e.g., Android (registered trademark), iOS (registered trademark), Windows (registered trademark)), middleware, and an application used for providing the below-described functions of the portable terminal 300.

The display unit 105 includes a liquid crystal display or an organic electroluminescence display for displaying a UI (User Interface) screen. A graphic control unit (not illustrated) interprets a plotting command written to a video RAM by the CPU 101 and causes the display unit 105 to display various data such as a window, a menu, a cursor, a character, or an image. The display unit 105, which has a touch panel integrated thereto, displays a soft-key.

The operation unit 106 includes a hard-key, a button(s), and a touch panel for receiving (accepting) the user's operations. The content of the operations performed on the hard-key or the soft-key is notified to the CPU 101.

The media I/F 107 controls reading or writing (storing) of data with respect to recording media such as a flash memory.

The program 112 may be a file that is distributed and recorded to a computer-readable recording medium 600 in a format that is installable and executable by a computer. Further, the program 112 may be a file that is distributed to the portable terminal 300 in a format that is installable from a server (not illustrated) and executable by the portable terminal 300.

The wireless LAN communication unit 108 controls, for example, a modulation type, a transmission rate, and a frequency based on IEEE802.11b/11a/11g/11n and transmits/receives data. In a case of receiving data, the wireless LAN communication unit 108 converts received radio waves into digital signals. In a case of transmitting data, the wireless LAN communication unit 108 receives a request to transmit data, processes (e.g., modulates) the data in compliance with a communication standard, and transmits the data as radio waves. The IP address of the portable terminal is provided from an access point of a wireless LAN.

The carrier communication unit 109 performs various communications according to the carrier contracted to the user of the portable terminal 300. The carrier may be, for example, a mobile phone telecommunications carrier for communicating with communication standards such as CDMA (Code Division Multiple Access), LTE (Long Term Evolution) or a WiMax carrier. A SIM (Subscriber Identity Module) card is attached to the carrier communication unit 109. The SIM card is an IC card in which subscriber data issued from a telecommunication carrier to each subscriber is stored. Data such as a unique number referred to as IMSI (International Mobile Subscriber Identity) and a mobile phone number are stored in the SIM card.

The carrier communication unit 109 performs modulation or the like on data according to a communication method set by a telecommunications carrier and transmits the data to a base station (not illustrated) connected to the Internet. The base station (not illustrated) is connected to a server of the telecommunications carrier, and the server of the telecommunications carrier assigns a temporary IP address to the portable terminal 300. The portable terminal 300 can also communicate with the image forming apparatus 100 via the Internet.

The camera 110 is an imaging unit including a photoelectric conversion element of a CCD (Charge Coupled Device) or a CMOS (Complementary Metal Oxide Semiconductor). The short distance wireless communication unit 111 is a wireless communication device used for short distance wireless communication such as Bluetooth (registered trademark), IC communication, and UWB (Ultra Wide Band) communication.

Figure 4:
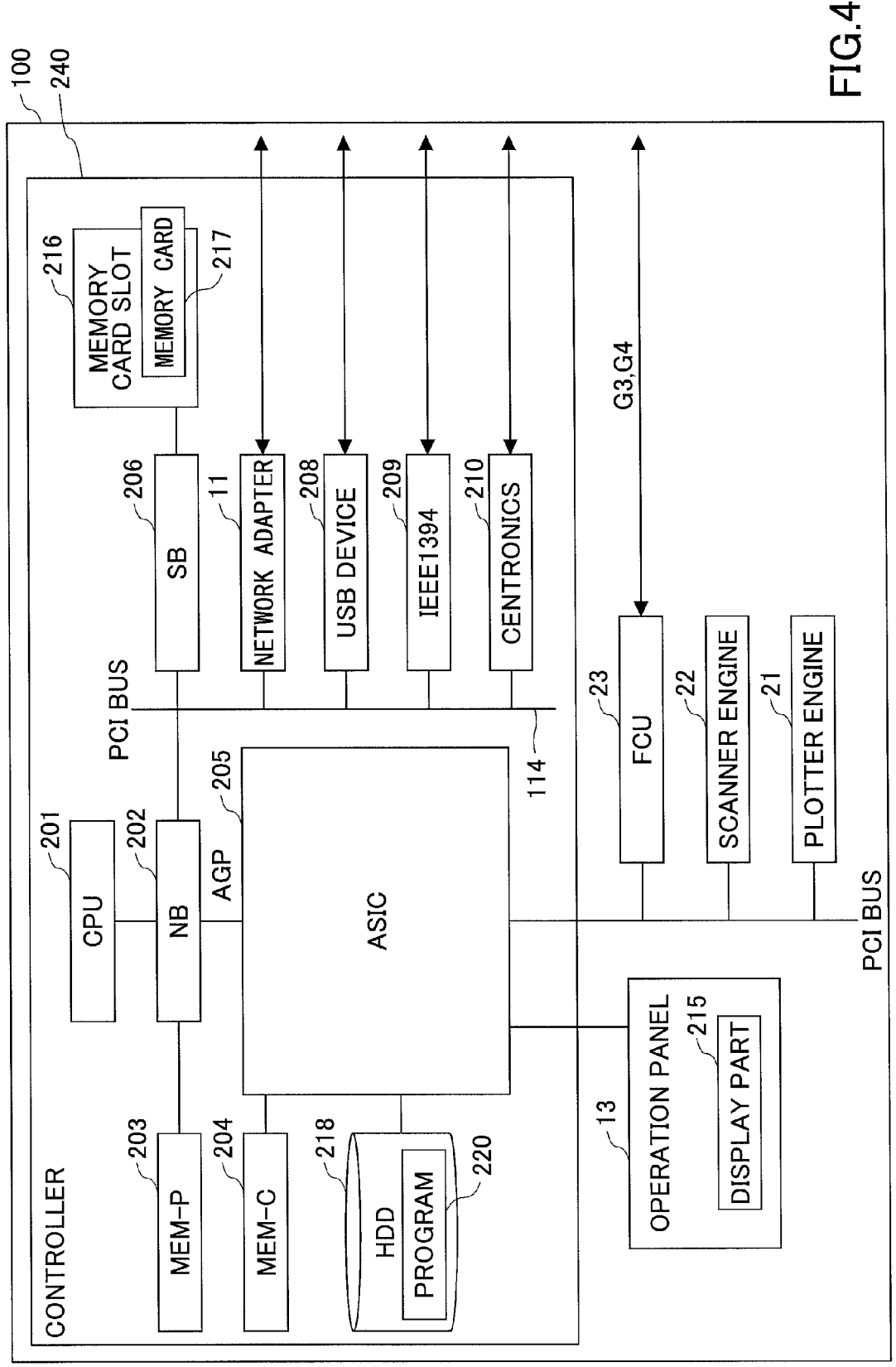
FIG. 4 is a schematic diagram illustrating an example of a hardware configuration of an image forming apparatus according to an embodiment of the present invention.

FIG. 4 is a schematic diagram illustrating an example of a hardware configuration of the image forming apparatus 100 according to an embodiment of the present invention. The image forming apparatus 100 includes a controller 240, an operation panel 13, a FCU (Facsimile Control Unit) 23, a scanner engine 22, and a plotter engine 21.

The controller 240 includes a CPU 201, an ASIC 205, a NB (North Bridge) 202, a SB (South Bridge) 206, a MEM-P (system memory) 203, a MEM-C (local memory) 204, a HDD (Hard Disk Drive) 218, a memory card slot 216, a network adapter (network interface controller) 11, a USB device 208, a IEEE1394 device 209, and a centronics device 210.

The CPU 201 is an IC for executing various data processes. The CPU 201 executes programs and applications for providing various services by using an OS such as UNIX (registered trademark) or Linux (registered trademark). The CPU 201 executes the programs and applications in parallel in units of processes. The ASIC 205 is an IC used for image processing. The NB 202 is a bridge for connecting the CPU 201 and the ASIC 205. The SB 206 is a bridge for connecting the NB 202 and other peripheral devices. The ASIC 205 and the NB 202 are connected via a AGP (Accelerated Graphics Port).

The MEM-P 203 is a memory connected to the NB 202. The MEM-C 204 is a memory connected to the ASIC 205. The HDD 220 is a storage unit connected to the ASIC 205 and is used for storing, for example, image data, document data, program data, font data, and form data.

The memory card slot 216 is connected to the SB 206 and is used for setting (inserting) a memory card 217. The memory card 217 is a flash memory (e.g., USB memory) and is used for distributing a program 220.

The network adapter 11 is a controller for performing data communications via a wireless LAN or a cable (wired) LAN. The network adapter 11 performs the data communications by using a MAC address as identification data. The network adapter 11 mainly performs processes of Layers 1 and 2. Thereby, the OS, the middleware, or the application controls communications of upper level layers. Further, in a case where the portable terminal 300 performs communication using Bluetooth (registered trademark), the network adapter 11 functions as a Bluetooth (registered trademark) communication module. Further, in a case where the portable terminal 300 performs communication using IC communication (e.g., NFC, Near Field Communication), the network adapter 11 functions as an IC communication device.

In a case of wireless LAN communication, the network adapter has communication modes including an infrastructure mode for communicating with the image forming apparatus 100 via an access point and an adhoc mode for directly communicating with the image forming apparatus 100. An adhoc network forms a one-on-one network between the portable terminal 300 and the image forming apparatus 100. The procedure for connecting with the infrastructure mode or the adhoc mode may be performed as follows. An access point or the image forming apparatus 100 serving as an access point periodically transmits a beacon(s) to the surrounding of the access point or the image forming apparatus 100. The beacon includes data pertaining to, for example, channel (frequency range), ESSID, transmission rate, security method, time stamp, and QoS. When the portable terminal 300 enters a reachable (communicable) range of the beacon, the portable terminal 300 requests a probe, that is, transmits an ESSID set to the portable terminal 300 when receiving the beacon. Then, the image forming apparatus 100 can communicate with the portable terminal 300 after authenticating the portable terminal 300 by using either an open system authentication method or a common key authentication method. In a case where the common key authentication method is used, the portable terminal 300 has an encryption key beforehand.

In a case of Bluetooth (registered trademark) communication, the portable terminal 300 starts communication with the image forming apparatus 100 when the portable terminal 300 enters a communicable range of the image forming apparatus 100 on condition that a PIN code is set to the portable terminal 300.

Further, the USB device 208 is a device that provides a serial port complying with a USB standard. The IEEE 1394 device 209 is a device that provides a serial port complying with a IEEE 1394 standard. The centronics device 210 is a device that provides a parallel port complying with centronics specifications. The network adapter 11, the USB device 208, the IEEE 1394 device 209, and the centronics device 210 are connected to the NB 202 and the SB 206 via a PCI (Peripheral Component Interconnect) bus.

The program 220 includes, an OS, middleware, and programs for providing the below-described functions of the image forming apparatus 100. The program 220 may be a file that is distributed and recorded to a computer-readable recording medium in a format that is installable and/or executable by a computer. Further, the program 220 may be a file that is distributed to the image forming apparatus 100 in a format that is installable from a server (not illustrated) and executable by the image forming apparatus 100.

The operation panel 13 includes the display part 215. The display part 215 functions as a hardware device (operation part) to which data is input to the image forming apparatus 100 and a hardware device from which data of the image forming apparatus 100 is provided to the user. The operation panel 13 is connected to the ASIC 205. Although the operation panel 13 is included in the image forming apparatus 100, the operation panel 13 may be omitted from the image forming apparatus 100 since the user can operate the image forming apparatus 100 from the portable terminal 300. Nevertheless, in the embodiment illustrated in FIGS. 2 and 4, the operation panel 13 is included in the image forming apparatus 100.

The FCU 23, the scanner engine 22, and the plotter engine 21 are connected to the ASIC 205 via the PCI bus.

The scanner engine 22 optically scans a manuscript or the like placed on a document glass of the image forming apparatus 100, performs A/D conversion on the light reflected by the scanning, and performs an image process on A/D converted data. Thereby, digital data (hereinafter also referred to as "image data") of a predetermined resolution is generated.

The plotter engine 21 includes, for example, a tandem type photoconductor drum. The plotter engine 21 forms a latent image by modulating a laser beam and scanning the photoconductor drum based on the image data. Then, an image is developed page-by-page by adhering toner to the latent image and transferred to a sheet of paper by applying heat and pressure to the developed image. The plotter engine 21 is not limited to a plotter using an electrophotographic method. For example, the plotter engine 21 may be an inkjet type plotter engine that forms an image by ejecting liquid droplets to a sheet of paper.

The FCU 23 transmits/receives image data by connecting to a network via the network adapter 11 and performing a communication procedure according to, for example, a T.37 standard or a T.38 standard. The FCU 23 may also transmit/receive image data by connecting to a public switched telephone network and performing a communication procedure according to, for example, a G3 or a G4 standard. Further, when receiving image data in a case where the power of the image forming apparatus 100 is switched off, the plotter engine 21 can be activated, so that the image data can be printed on a sheet of paper.

Returning to FIG. 2, the functions (functional units) of the image forming apparatus 100 is described. In FIG. 2, like components are denoted with like reference numerals as those of FIG. 4 and are not further described. In FIG. 2, the distance detection unit 14 and the job management unit 15 are connected to the memory management unit 17, the engine management unit 18, and the user management unit 19 via the API (Application Interface). The functional units of the image forming apparatus 100 is not limited to the configuration illustrated in FIG. 2 and may be arranged differently than the configuration of FIG. 2 as long as a functional unit(s) can communicate with another desired functional unit(s).

The UI management unit 12 manages the UI (User Interface) of the image forming apparatus 300 and the portable terminal 300. The UI management unit 12 is described in detail below.

The distance detection unit 14 detects the distance between the portable terminal 300 and the image forming apparatus 100. As one method for detecting the distance between the portable terminal 300 and the image forming apparatus 100, the distance may be detected by using the response time when performing Bluetooth (registered trademark) communication. For example, the distance detection unit 14 may measure a response period starting from a time of transmitting data to the portable terminal 300 via the network adapter 11 to a time of receiving data from the portable terminal 300 via the network adapter 11.

Alternatively, the distance may be detected by using a wireless LAN. In an adhoc mode, the portable terminal 300 communicates with the image forming apparatus 100 without accessing an access point. Therefore, the distance detection unit 14 may measure the distance between the image forming apparatus 100 and the portable terminal 300 in a similar manner as the case of performing Bluetooth (registered trademark) communication. Further, the distance detection unit 14 may determine that the portable terminal 300 is positioned near the image forming apparatus 100 in a case where the image forming apparatus 100 is able to communicate with the portable terminal 300 by using IC communication whereas the distance detection unit 14 determines that the portable terminal 300 is positioned far from the image forming apparatus 100 in a case where the image forming apparatus 100 is unable to communicate with the portable terminal 300 by using IC communication.

In this embodiment, the distance detection unit 14 determines that the portable terminal 300 is positioned near the image forming apparatus 100 when the measured (estimated) distance is less than 1 m and determines that the portable terminal 300 is far from the image forming apparatus 100 when the measured (estimated) distance is greater than or equal to 1 m. The threshold of the distance between the portable terminal 300 and the image forming apparatus 100 of "1 m" is merely an example. For example, the threshold of the distance between the portable terminal 300 and the image forming apparatus 100 may be "2 m".

Alternatively, the distance detection unit 14 may be included in the portable terminal 300 instead of the image forming apparatus 100. In this case, the distance detection unit 14 included in the portable terminal 300 transmits the measured distance to the image forming apparatus 100. Alternatively, the distance measurement unit 14 may calculate the distance between the image forming apparatus 100 and the portable terminal 300 based on position data. In this case, both the portable terminal 300 and the image forming apparatus 100 measures its position data by using, for example, GNSS (Global Navigation Satellite Systems) and transmits the measured position data to each other, so that the distance measurement unit 14 can calculate the distance based on the measured position data.

The job management unit 15 receives operations from the portable terminal 300 or the operation panel 13 and registers the operations as jobs. The jobs may include, for example, a printing job, a copying job, a scanning job, or a transmitting job depending on the functions of the image forming apparatus 100. The job management unit 15 receives a job type (type of job) and setting data (data that can be set to the image forming apparatus 100) corresponding to the job type. The setting data may be, for example, number of pages, double-side, or finishing. The job management unit 15 executes a job based on the content of the job that has been registered. Further, the job management unit 15 obtains (gathers) data pertaining to the status of the image forming apparatus 100 (e.g., whether each functional part of the image forming apparatus 100 is operational, remaining amount of consumable supplies, error content) and the status (job status) of each job from the entire image forming apparatus 100 and provides the obtained data to the UI management unit 12.

The engine management unit 18 manages each of the engines of the image forming apparatus 100 such as the plotter engine 21 and the scanner engine 22. In a case of managing the scanner engine 22, the engine management unit 18 controls, for example, an ADF (Automatic Document Feeder), a moving speed of a line sensor, and an image processing operation (e.g., γ correction) of a scanned image. In a case of managing the plotter engine 21, the engine management unit 18 controls, for example, an image forming operation, a sheet discharge operation, and a fixing temperature.

The memory management unit 17 performs memory management including securing (reserving) a memory and releasing a memory in correspondence with the job to be executed. The user management unit 19 manages user data. The user management unit 19 includes user data that has been registered beforehand.

FIG. 5A is a schematic diagram illustrating an example of user data. The user data includes a "user ID" associated to a "password". The user ID is identification data for uniquely identifying each user. In addition to the user ID (or instead of the user ID), a user name may be set (registered). The "password" is a numeral, an alphabet letter, a symbol, or a combination thereof for enabling the image forming apparatus 100 to authenticate the user (for allowing the user to log-in to the image forming apparatus 100).

[UI Management Unit]

Figure 6:
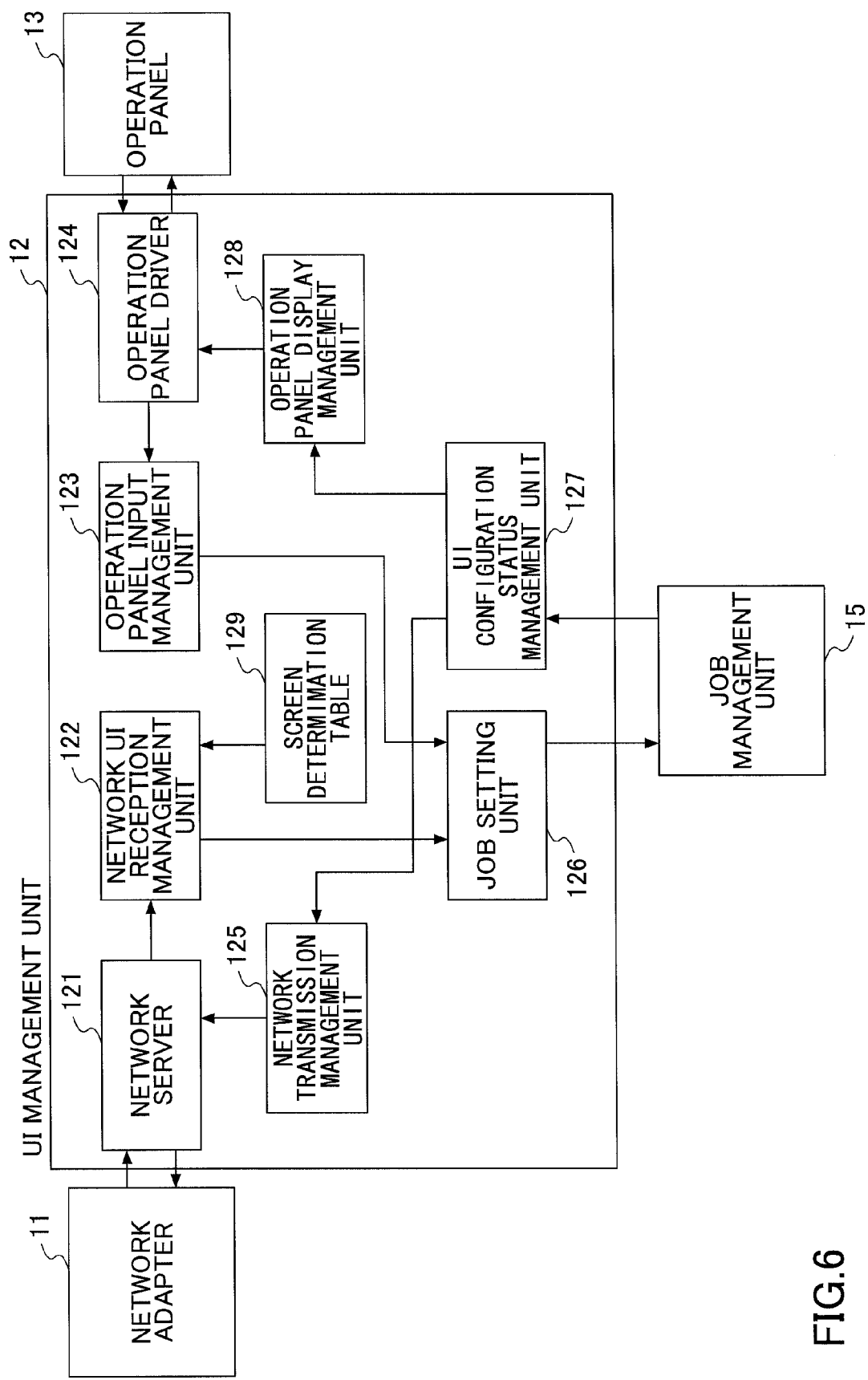
FIG. 6 is a block diagram illustrating an example of functional parts of an UI management unit according to an embodiment of the present invention.

FIG. 6 is a block diagram illustrating an example of functional parts of the UI management unit 12 according to an embodiment of the present invention. The UI management unit 12 includes a network server 121, a network UI reception management unit 122, a network transmission management unit 125, an operation panel input management unit 123, a job setting unit 126, a UI configuration status management unit 127, an operation panel display management unit 128, a screen determination table 129, and an operation panel driver 124.

The network server 121 is a server that controls communications with the portable terminal 300 according to a protocol stack (e.g., TCP/IP) and a protocol (e.g., HTTP). The network server 121 is one example of a server unit. In a case of transmitting data, the network server 121 obtains the data from the network transmission management unit 125, includes transmission frames (packets) into the data in compliance with a communication standard, stores the data in a transmission buffer of the network adapter 11, and requests the network adapter 11 to transmit the data. In a case of receiving data, the network server 121 reads out communication frames stored in a reception buffer of the network adapter (e.g., by using interruption) and sends the read out communication frames to the network UI reception management unit 122.

The network UI reception management unit 122 refers to the screen determination table 129 and determines a screen to be designated (instructed) to the job setting unit 126 based on the distance detected by the distance detection unit 14.

FIG. 5B is a schematic diagram illustrating an example of the screen determination table 129. The screen determination table 129 includes a "user ID" registered in association with items such as "short distance", "long distance", "setting content (short distance)", and "setting content (long distance)". A screen to be displayed on the user's portable terminal 300 when the distance between the image forming apparatus 100 and the portable terminal 300 is short (i.e. near) is registered in the item "short distance" of the screen determination table 129. A screen to be displayed on the user's portable terminal 300 when the distance between the image forming apparatus 100 and the portable terminal 300 is long (i.e. far) is registered in the item "long distance" of the screen determination table 129. The item "setting content (short distance)" indicates the content of an initial setting(s) of a registered screen to be displayed when the distance between the image forming apparatus 100 and the portable terminal 300 is short. For example, in a case where the registered screen is a "copier screen" that is displayed when the distance between the image forming apparatus 100 and the portable terminal 300 is short, the settings initially set by the user (e.g., the printing color (monochrome, full color, two color), the density when reading image from a manuscript, the paper-size (automatic, A4, B5), magnification, single-side/double-side printing, sort) are registered to the item "setting content (short distance)" of the screen determination table 129. The item "setting content (long distance)" indicates the content of an initial setting(s) of a registered screen to be displayed when the distance between the image forming apparatus 100 and the portable terminal 300 is long. In a case where no contents are required to be initially set with respect to both item "setting content (short distance)" and the item "setting content (long distance)" (i.e., same settings to be applied to the user regardless of distance), no particular setting content need be registered in the item "setting content (short distance)" and the item "setting content (long distance)".

Further, a screen(s) need not be registered in correspondence with each user. That is, an initial setting screen may be commonly displayed to each of the users.

Returning to FIG. 6, the network UI reception management unit 122 designates a screen to the job setting unit 126. After the portable terminal 300 displays a screen corresponding to the distance from the image forming apparatus 100, the network server 121 receives data from the portable terminal 300 or the PC 200. Then, the network UI reception management unit 122 extracts data pertaining to the job type and the settings corresponding to the job from the received data and notifies the extracted data to the job setting unit 126.

The job setting unit 126 analyzes the job type and the settings and notifies (reports) a request to the job management unit 15 based on the analysis. For example, as a result of the analysis, there is a case of requesting the job management unit 15 to simply switch screens and a case of requesting the job management unit 15 to register a job.

In a case of the former, the job setting unit 126 requests the job management unit 15 to switch screens. Then, the job management unit 15 requests the UI configuration status management unit 127 to display a screen. Along with the requesting the display of the screen, the job management unit 15 notifies data required for generating the screen to be displayed (e.g., remaining amount of consumable supplies, status of errors) to the UI configuration status management unit 127.

In a case of the latter, the job setting unit 126 converts data settings notified by the network UI reception management unit 122 or the operation panel input management unit 123 into job data having a data format that can be processed by the job management unit 15 (a format uniformly (commonly) used by the image forming apparatus 100) and notifies the job data to the job management unit 15. Thereby, the job management unit 15 registers a job based on the received job data and manages execution of the job. For example, the job management unit 15 may register jobs in an order corresponding to an order in which jobs are received from the job setting unit 126.

The UI configuration status management unit 127 receives a notification (report) from the job management unit 15 and notifies screen configuration data to the network transmission management unit 125 or the operation panel display management unit 128. The UI configuration status management unit 127 determines whether to notify the screen configuration data to the network transmission management unit 125 or the operation panel display management unit 128 depending on whether the user is operating on the portable terminal 300 or the operation panel 13.

The screen configuration data is data that constitutes a screen to be displayed. For example, the screen configuration data includes the size/color/position of a figure (graphic symbol) that constitutes a screen or the size/position of a character or a symbol indicated in the figure. The report from the job management unit 15 may include data pertaining to the status of the image forming apparatus 100 or a job status of each job. The UI configuration status management unit 127 already has screen configuration data of a screen of a job to be executed. By considering the screen configuration data together with the content of the settings of the screen determination table 129 of FIG. 5B and the report received from the job management unit 15, the UI configuration status management unit 127 determines a status of a screen. Although the format of the screen configuration data is not limited in particular, the format of the screen configuration data may be, for example, XML (eXtensible Markup Language) or HTML (Hyper Text Markup Language).

The network transmission management unit 125 notifies the screen configuration data received from the UI configuration status management unit 127 to the network server 121.

The operation panel display management unit 128 notifies the screen configuration data received from the UI configuration status management unit 127 to the operation panel driver 124. The operation panel driver 124, which is a driver for communicating with the operation panel 13, displays a screen based on the screen configuration data. The operation panel driver 124 notifies a user operation position (position of the user's operation) to the operation panel input management unit 123.

The operation panel input management unit 123 analyzes the job type and settings instructed by the user based on the input from the operation panel driver 124, and notifies the job type and settings based on the analysis.

[Functions of Portable Terminal]

Figure 7:
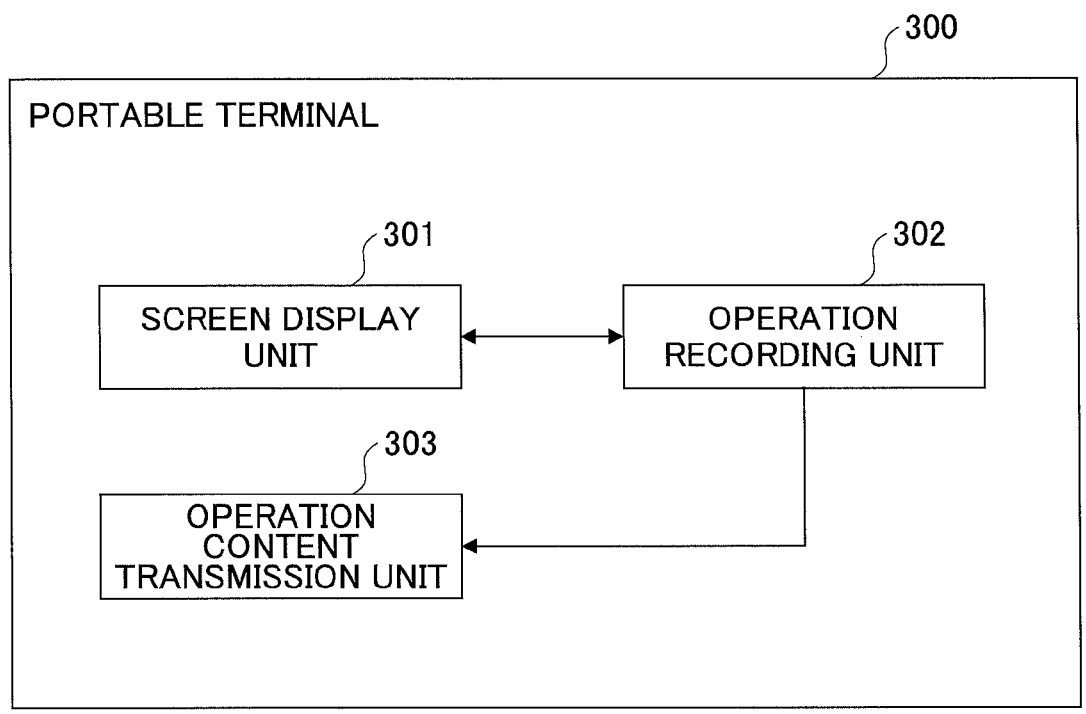
FIG. 7 is a block diagram illustrating an example of functional parts of a portable terminal according to an embodiment of the present invention.

FIG. 7 is a block diagram illustrating an example of functional parts of the portable terminal 300 according to an embodiment of the present invention. The portable terminal 300 includes a screen display unit 301, an operation recording unit 302, and an operation content transmission unit 303. The screen display unit 301 interprets image configuration data received from the image forming apparatus 100 and displays the image configuration data on the display unit 105. The operation recording unit 302 obtains position data of the user's finger tip on the screen from a touch panel and records the operation of the user based on the arrangement of the keys (e.g., soft-keys) corresponding to the obtained position data. For example, in a case where a copier screen is displayed, the operation recording unit 302 records selections/operations of the user such as selection of paper size and/or selection of single-side/double-side printing.

The operation content transmission unit 303 transmits an operation content (setting data of a job) to the image forming apparatus 100, for example, when the user taps on a start key or a soft-key-like button. In a case where the portable terminal 300 communicates with the image forming apparatus 100 by using Bluetooth (registered trademark), the portable terminal 300 can communicate by way of a common (shared) profile once a pairing process is completed. Further, in a case where the portable terminal 300 communicates with the image forming apparatus 100 via a wireless LAN, the portable terminal 300 can communicate with the image forming apparatus 100 once the portable terminal 300 obtains an IP address of the image forming apparatus 100. Because the operation content transmission unit 303 (application corresponding to the operation content transmission unit 303) operating in the portable terminal 300 is designed to be used with respect to the image forming apparatus 100, a profile and/or an IP address of the image forming apparatus 100 may be registered in the operation content transmission unit 303 (application corresponding to the operation content transmission unit 303) beforehand. Thus, once the portable terminal 300 obtains an IP address of the image forming apparatus 100, the operation content transmission unit 303 obtains a MAC address of the image forming apparatus 100 by using, for example, ARP (Address Resolution Protocol).

[Case of Use]

Figure 8:
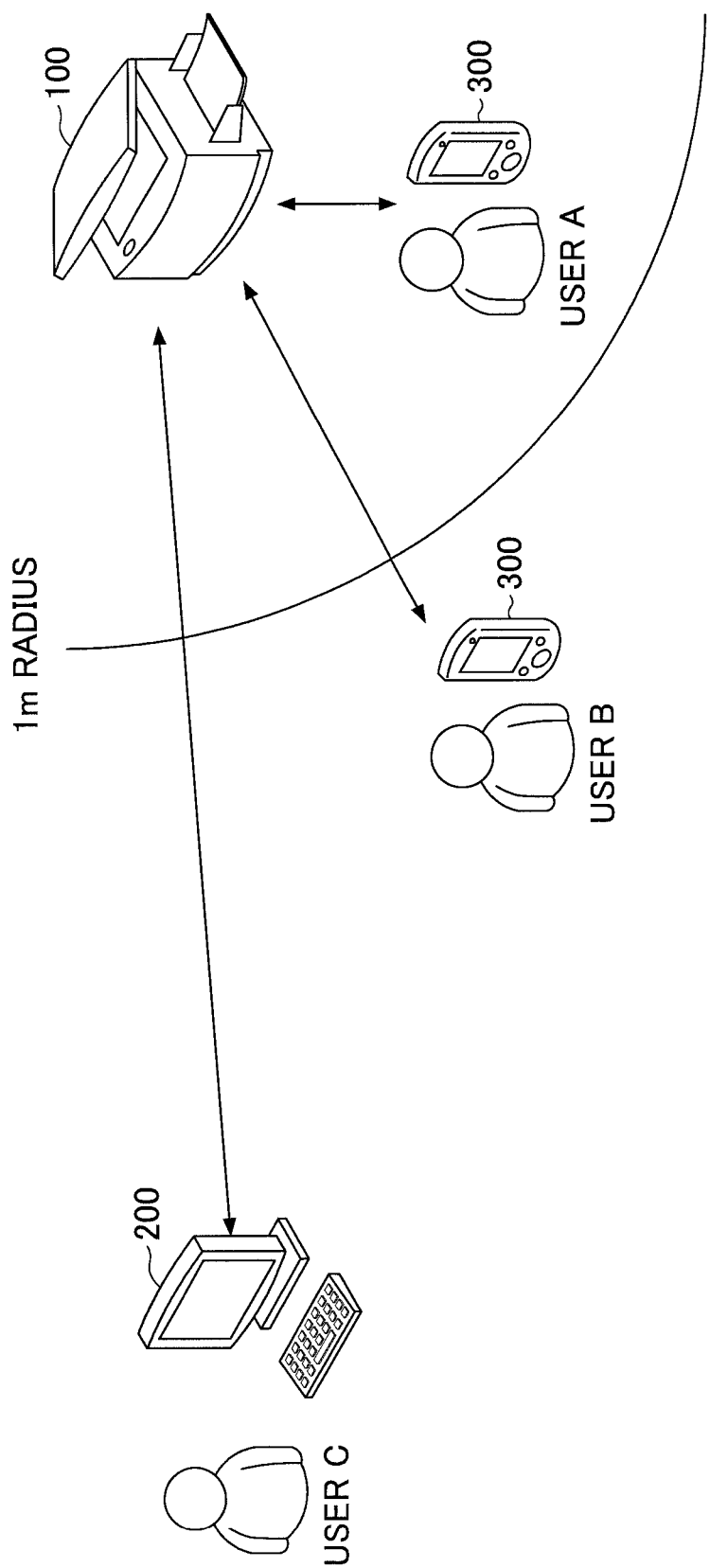
FIG. 8 is a schematic diagram for describing a case where a user uses an image forming apparatus according to an embodiment of the present invention.

FIG. 8 is a schematic diagram for describing a case where the user uses the image forming apparatus 100 according to an embodiment of the present invention. In the case of FIG. 8, the distance between the image forming apparatus 100 and the user A is less than 1 m whereas the distance between the image forming apparatus 100 and the user B is greater than or equal to 1 m. Both users A and B carry the portable terminal 300, respectively. However, user C carries the PC 200 and communicates with the image forming apparatus 100 by using the PC 200. The distance between the user C and the image forming apparatus 100 is greater than or equal to 1 m.

As described above, in a case where the threshold is 1 m, the user A is positioned a short distance from the image forming apparatus 100 whereas the user B is positioned a long distance from the image forming apparatus 100. Therefore, a screen displayed on the portable terminal 300 of the user A is different from a screen displayed on the portable terminal 300 of the user B. Because the image forming apparatus 100 and the PC 200 of the user C is connected by wire or cable, the distance from the image forming apparatus 100 does not affect the display of the PC 200 of the user C.

Because a user may sometimes operate the portable terminal 300 while moving to another location, a user that was positioned no less than 1 m from the image forming apparatus 100 may approach the image forming apparatus 100 within a distance less than 1 m. Therefore, the distance between the portable terminal 300 and the image forming apparatus 100 is preferred to be measured at a time when the user has stopped moving or at a certain cycle (i.e. measured periodically). Thereby, even in a case where the user operates the portable terminal 300 and communicates with the image forming apparatus 100 while moving to another location, an appropriate screen corresponding to the distance between the portable terminal 300 and the image forming apparatus 100 can be provided.

Further, by recording the distance between the user and the image forming apparatus 100 in chronological order and determining the direction in which the user is headed (direction moving away from the image forming apparatus 100 or direction moving toward the image forming apparatus 100), it can be determined that the user is near (short distance) the image forming apparatus 100 before the user enters a range within 1 m from the image forming apparatus 100. For example, it may be determined that the user is near the image forming apparatus 100 when the user heading toward the image forming apparatus 100 is positioned within 3 m from the image forming apparatus 100.

[Operation Procedure]

Figure 9:
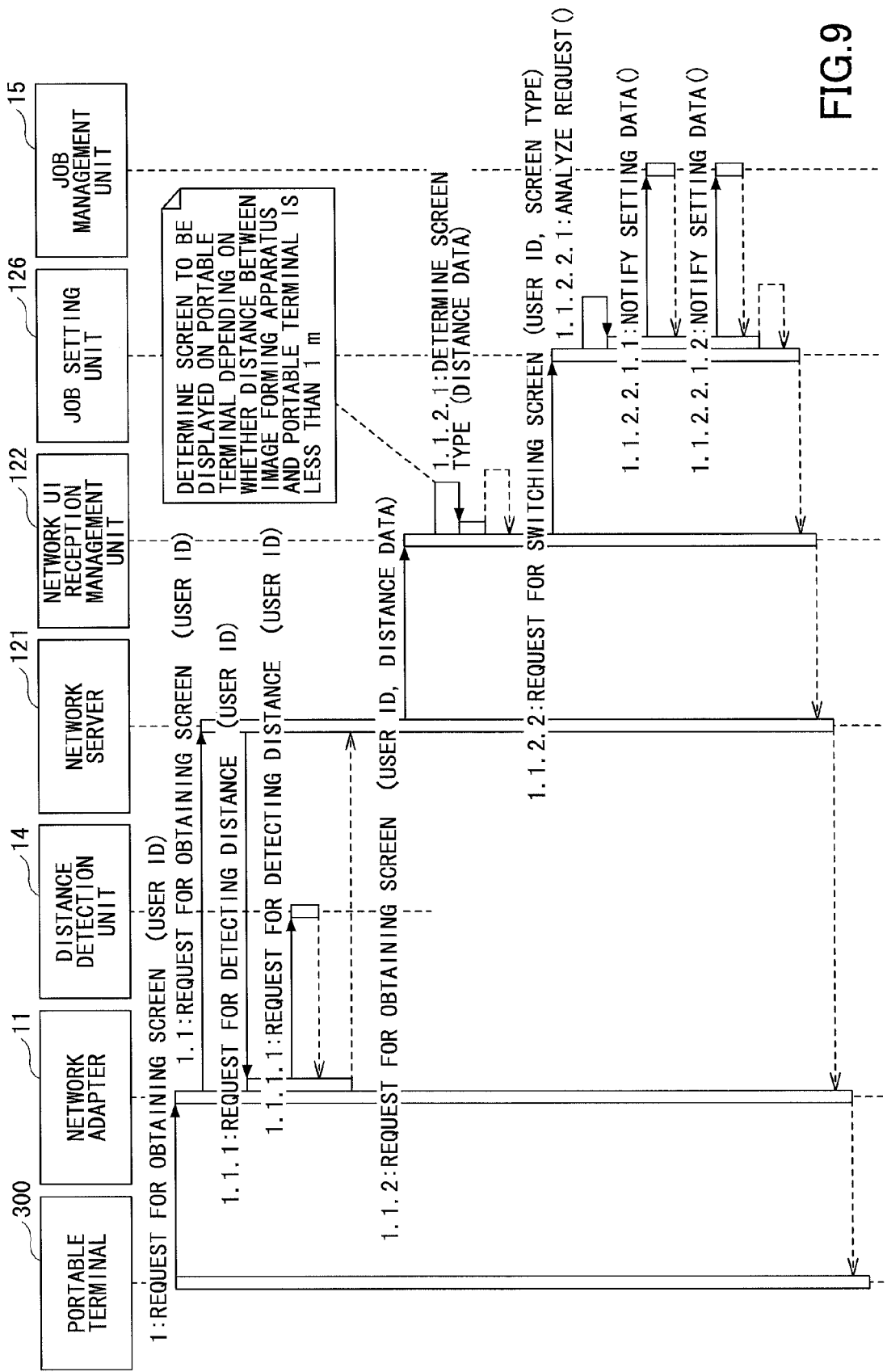
FIG. 9 is a flowchart illustrating an example of procedures of an operation performed when a portable terminal requests a screen from an image forming apparatus according to an embodiment of the present invention.

FIG. 9 is a flowchart illustrating an example of procedures of an operation performed when the portable terminal 300 requests a screen from the image forming apparatus 100 according to an embodiment of the present invention. In the example of FIG. 9, it is assumed that: communication between the portable terminal 300 and the image forming apparatus 100 is already established by, for example, Bluetooth (registered trademark); a user ID and a password has already been transmitted from the user's portable terminal 300; and authentication of the user has been completed. Further, in the below-described examples of FIGS. 9 and 10, the data that are indicated inside the parenthesis of a corresponding request or notification indicate data included in the corresponding request or notification.

Step S1: In order to operate the image forming apparatus 100, first, the user activates an application by operating the portable terminal 300. The application may be, for example, a word processor application or a printer utility. The user further operates the portable terminal 300 to transmit a screen obtaining request (request for obtaining a screen) along with the user's user ID from the user's portable terminal 300 to the network adapter 11. The user's user ID may be registered beforehand in the portable terminal 300 or input to portable terminal 300 by the hand or voice of the user.

S1.1: Then, the network adapter 11 notifies the screen obtaining request along with the user ID to the network server 121 of the UI management unit 12.

S1.1.1: Then, the network server 121 transmits a distance detection request (request for detecting distance between the portable terminal 300 and the image forming apparatus 100) along with the user ID to the distance detection unit 14 by way of the network adapter 11.

S1.1.1.1: Then, the network adapter 11 notifies the distance detection request and the user ID to the distance detection unit 14. Then, the distance detection unit 14 notifies the distance between the portable terminal 300 and the image forming apparatus 100 to the network adapter 11. Then, the network adapter 11 notifies the distance to the network server 121.

S1.1.2: Then, the network server 121 designates the user ID and distance data and notifies the screen obtaining request along with the designated user ID and the distance data to the network UI reception management unit 122.

S1.1.2.1: Then, the network UI reception management unit 122 refers to the screen determination table 129 based on the distance data and the user ID and determines a screen to be displayed on the portable terminal 300.

S1.1.2.2: Then, the network UI reception management unit 122 notifies a screen switch request (request for switching a screen to the screen determined by the network UI reception management unit 122) to the job setting unit 126.

S1.1.2.2.1: Then, the job setting unit 126 analyzes the screen switch request. That is, the job setting unit 126 determines the data required for the screen to be switched (displayed) based on the screen switch request.

S1.1.2.2.1.1-S1.1.2.2.1.2: Based on the results of the analysis, the job setting unit 126 notifies the data determined to be required for the screen to be displayed to the job management unit 15. The job setting unit 126 notifies the determined data, so that the job management unit 15 can be informed of the setting data (initial settings) when displaying the screen. In a case where the job setting unit 126 is unable to send the determined data (setting data) in a single notification (S1.1.2.2.1.1), the job setting unit 126 may repeat notifying the setting data to the job management unit 15 (S1.1.2.2.1.2).

Figure 10:
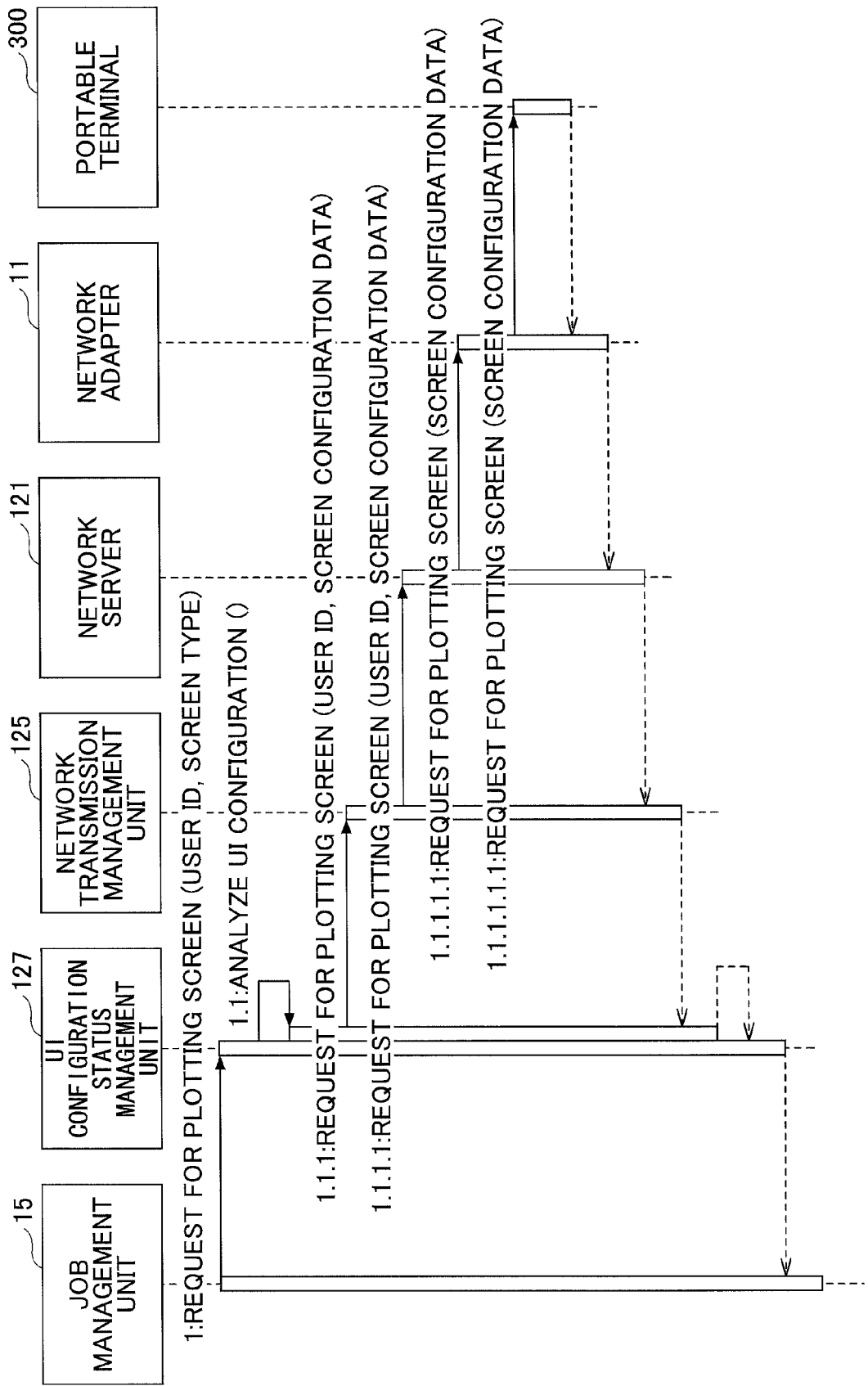
FIG. 10 is a flowchart illustrating an example of procedures of an operation performed when an image forming apparatus transmits screen data to a portable terminal according to an embodiment of the present invention.

FIG. 10 is a flowchart illustrating an example of procedures of an operation performed when the image forming apparatus 100 transmits screen data to the portable terminal 300 according to an embodiment of the present invention.

S1: The job management unit 15 notifies a screen plotting request (request for plotting a screen) to the UI configuration status management unit 127. For example, the screen plotting request includes a user ID and a data for identifying a screen.

S1.1: The UI configuration status management unit 127 obtains data required for plotting a requested screen and generates screen configuration data with the obtained data. For example, in a case of a screen for executing a job (job execution screen), the job execution screen is constituted by types of applications. In this case, it may be preferable to use the setting content of FIG. 5B. Further, in a case of displaying a screen to be used for confirming a status of the image forming apparatus 100, the UI configuration status management unit 127 requests the job management unit 15 to obtain the status of the image forming apparatus 100. By doing so, the UI configuration status management unit 127 can gather data required for plotting the requested screen.

S1.1.1: Then, the UI configuration status management unit 127 requests plotting of the requested screen by notifying screen configuration data along with the user ID to the network transmission management unit 125.

S1.1.1.1: Then, the network transmission management unit 125 instructs the network server 121 to transmit the screen configuration data to the portable terminal 300 along with the user ID.

S1.1.1.1.1: Then, the network server 121 identifies the portable terminal 300 to which the screen configuration data is to be transmitted by referring to the user ID, and notifies the screen plotting request (including the screen configuration data) to the portable terminal 300 by way of the network adapter 11.

S1.1.1.1.1.1: Then, when the screen configuration data has been transmitted from the network adapter 11 to the portable terminal 300, the portable terminal 300 displays a screen based on the screen configuration data. Thereby, the portable terminal 300 can display a screen in correspondence with the distance from the image forming apparatus 100.

In some cases, the size of the screen of the portable terminal 300 and the size of the screen of the operation panel 13 may be different. If the difference of screens is a subtle difference that can hardly be noticed (i.e. substantially same screen size), the screen displayed on the portable terminal 300 is preferred to have the same arrangement as the screen of the operation panel 13. Therefore, it is preferable for the portable terminal 300 to transmit, for example, its screen size together with user ID, so that the screen configuration data can be reduced in correspondence with screen size.

In a case where the reduction of screen configuration data may cause the size of characters to become too small that the characters are illegible, the UI configuration status management unit 127 refrains from reducing the screen configuration data. In this case, the entire screen cannot be displayed on the display part of the portable terminal 300. Therefore, the user views the entire screen by scrolling the screen on the display part of the portable terminal 300. In a case where the size of the display part of the portable terminal 300 is larger than the size of the operation panel 13, the screen may be displayed with blank spaces.

[Screen Example]

Figure 11:
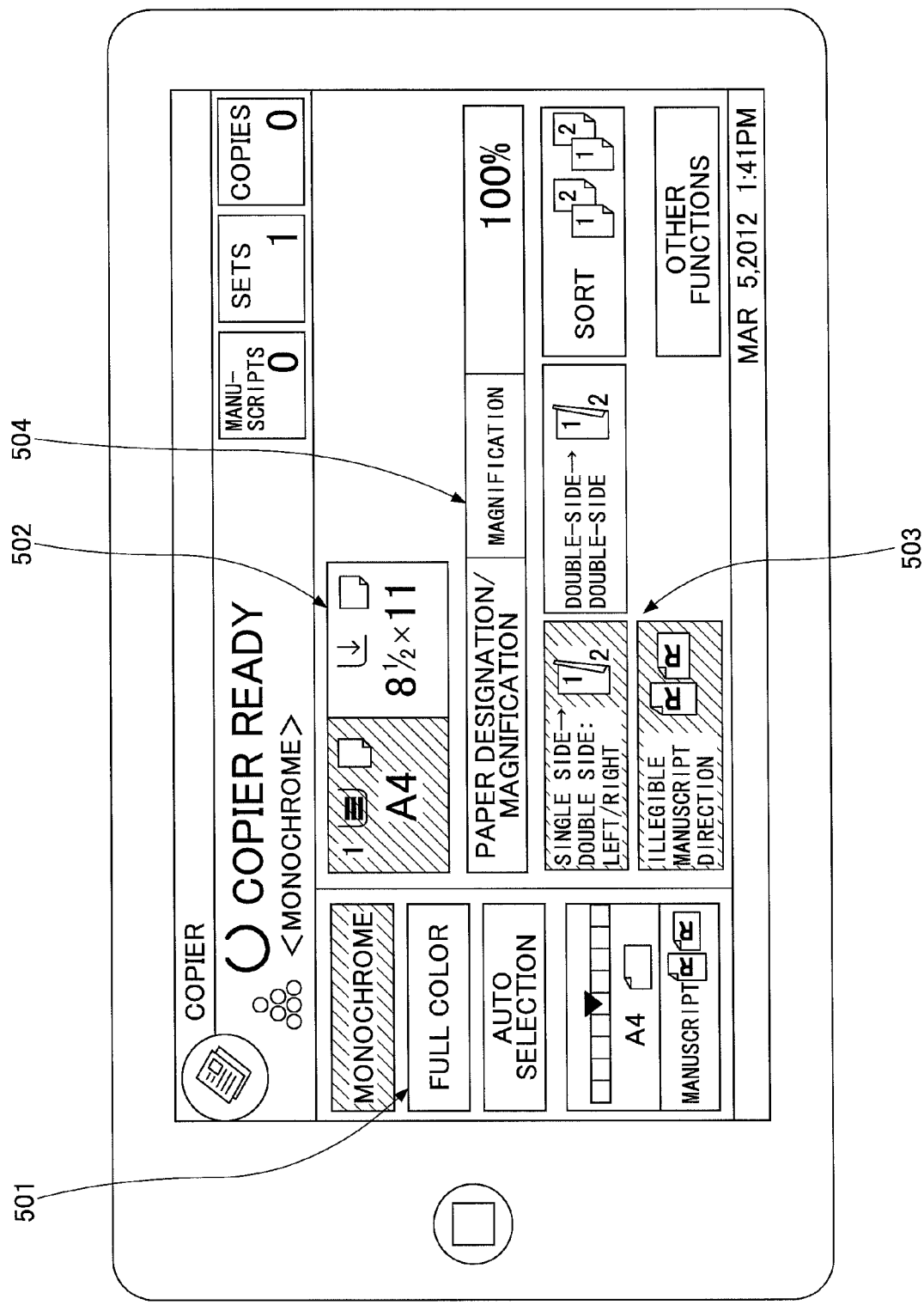
FIG. 11 illustrates an example of a copier screen according to an embodiment of the present invention.
Figure 12:
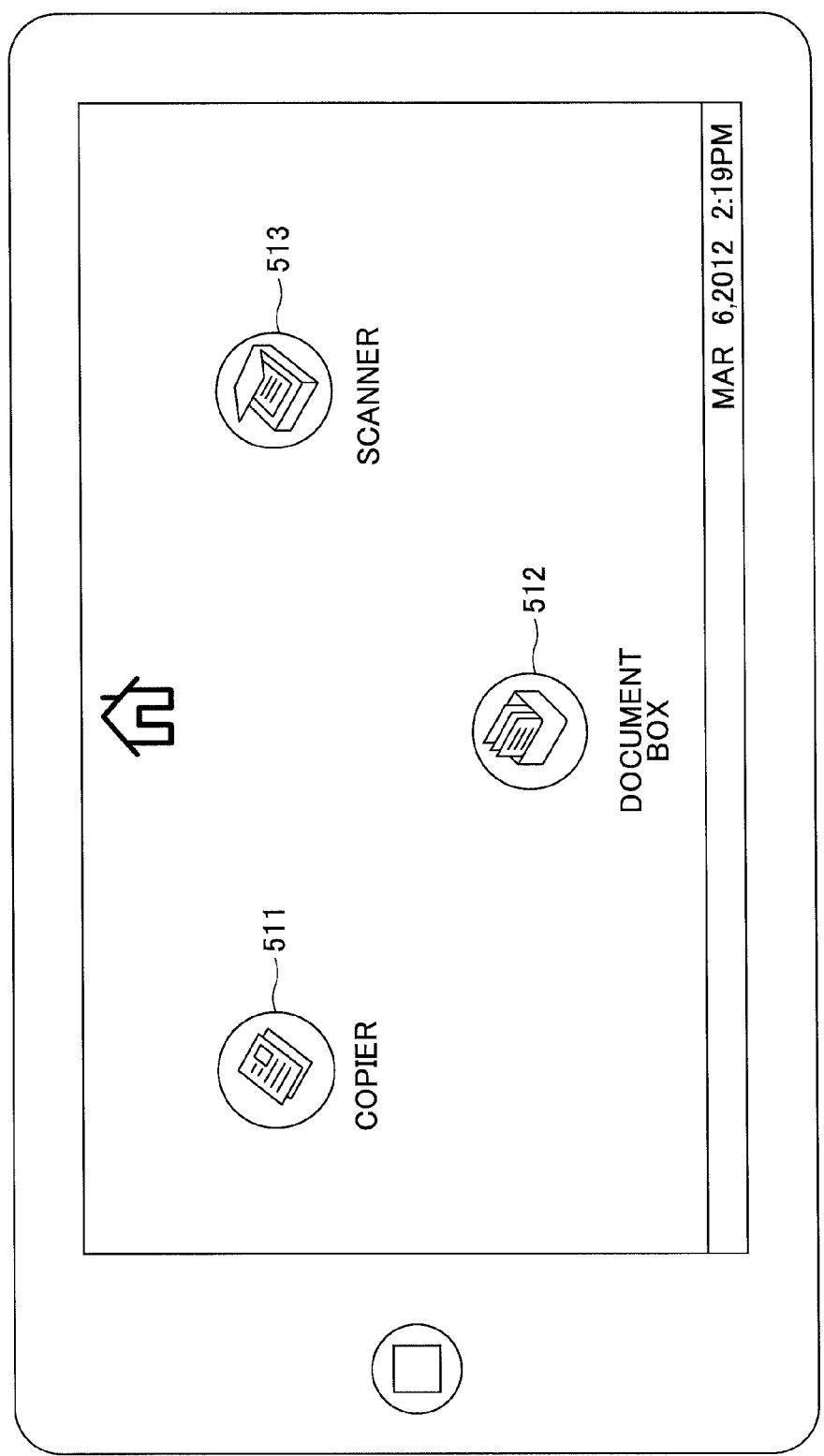
FIG. 12 illustrates an example of an application selection screen according to an embodiment of the present invention.

FIGS. 11 and 12 are schematic diagrams illustrating examples of a screen in a case where the distance between the portable terminal 300 and the image forming apparatus 100 is short (near) according to an embodiment of the present invention. FIG. 11 illustrates an example of a copier screen. FIG. 12 illustrates an example of an application selection screen.

In a case where the distance between the image forming apparatus 100 and the portable terminal 300 is less than 1 m (near), the user generally desires to instruct execution of a job by operating on the operation panel 13 of the image forming apparatus 100. Therefore, the portable terminal 300 displays a screen that is substantially the same as the screen displayed on the operation panel 13 when instructing execution of a job. Although FIG. 11 illustrates a copier screen, other screens such as a scanner screen, a document box screen, a printer screen, or a facsimile screen may be displayed by the portable terminal 300.

In a case where the image forming apparatus 100 is not provided with an operation panel, a "screen that is substantially the same as the screen displayed on an operation panel when instructing execution of a job" would be a screen that is displayed on an operation panel of an earlier type (model) of the image forming apparatus 100 or an operation panel of an image forming apparatus that is similar to the type (model) of the image forming apparatus 100.

In a case of displaying a copier screen, the copier screen may include, for example, a printing color selection column (i.e. column for selecting a printing color) 501, a paper selection column (i.e.

column for selecting type of paper) 502, a single-side/double-side selection column (i.e. column for selecting singe-side/double-side printing) 503, and a magnification designation column (i.e. column for designating magnification) 504. In the copier screen of FIG. 11, "monochrome" is selected as the printing color, "A4" is selected as the type of paper, and "single-side to double-side" is designated as the type of single-side/double-side printing.

Accordingly, the user can operate the image forming apparatus 100 by using the user's portable terminal 300 without having to use the operation panel 13 solely provided to the image forming apparatus 100. Further, the user can transmit setting data for executing a copier function of the image forming apparatus 100 from the user's portable terminal 300 even in a case where another user is operating the control panel of the image forming apparatus 100 to execute a printer function (printer application) of the image forming apparatus 100.

Further, in a case where the portable terminal 300 is near the image forming apparatus 100, an application selection screen may be displayed on the portable terminal 300 as illustrated in FIG. 12. In a case where the portable terminal 300 is near the image forming apparatus 100, there may be a situation in which the user does not desire to have a fixed application screen to be displayed for performing initial settings but still desires to instruct execution of a job by operating on the operation panel 13 of the image forming apparatus 100. In this kind of situation, the user can select an application screen to be used according to circumstance by displaying the application selection screen on the portable terminal 300. The screen illustrated in FIG. 12 is substantially the same as the screen displayed on the operation panel 13.

In FIG. 12, soft-keys for displaying each application are displayed on the screen of the portable terminal 300. In the example of FIG. 12, a soft-key 511 corresponding to "copier" application, a soft-key 512 corresponding to a "document box" application, and a soft-key 513 corresponding to a "scanner" application are displayed. Accordingly, the user can select a desired application. For example, in a case where "copier" is selected, the copier screen of FIG. 11 is displayed on the portable terminal 300. In a case where "document box" is selected, a document box screen is displayed on the portable terminal 300. For example, in a case of displaying the document box screen, the user may instruct, for example, printing or transmission of a document stored in the image forming apparatus 100. In a case where "scanner" is selected, a scanner screen is displayed on the portable terminal 300.

Figure 13:
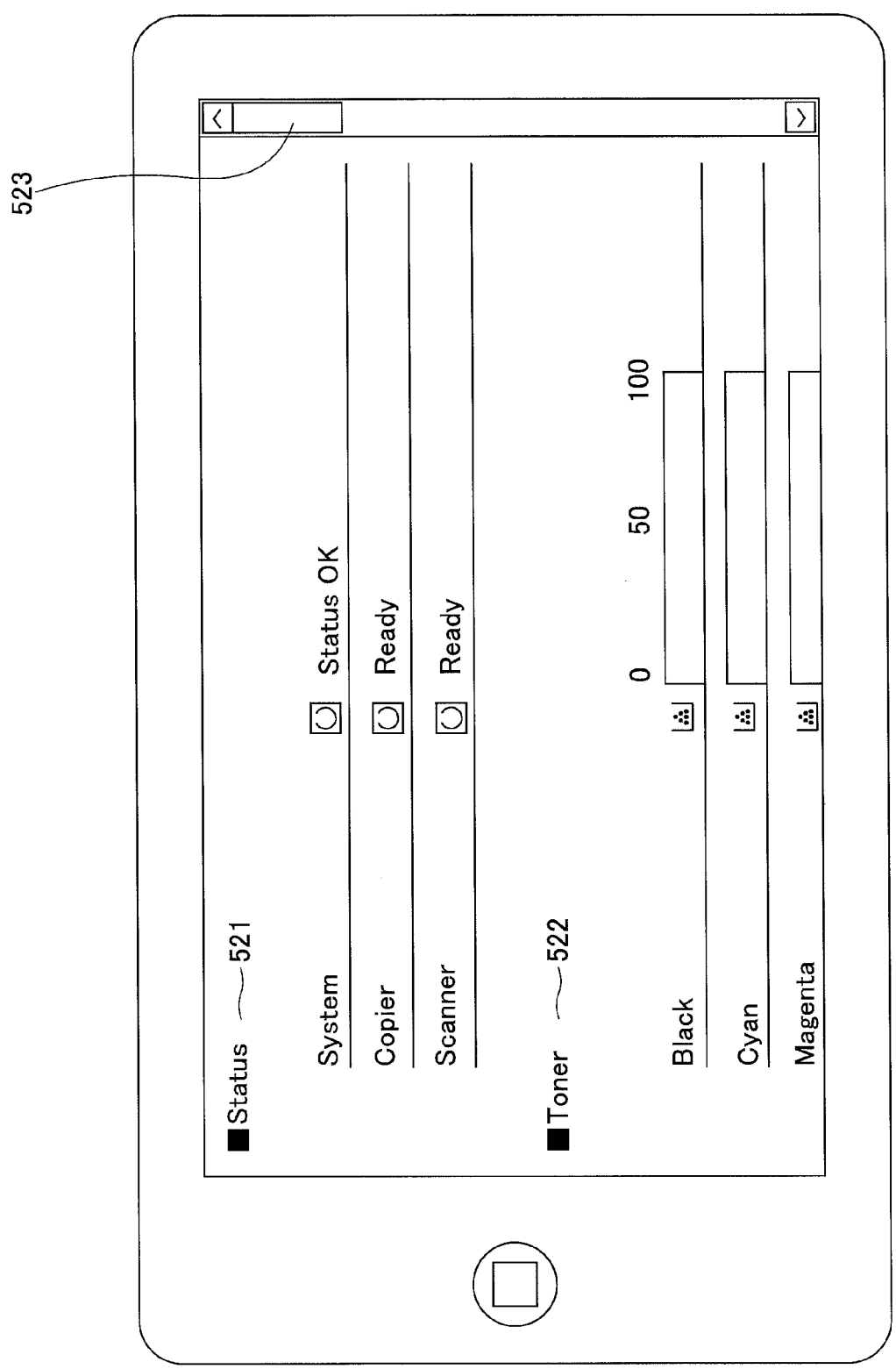
FIG. 13 is an example of a device status screen according to an embodiment of the present invention.
Figure 14:
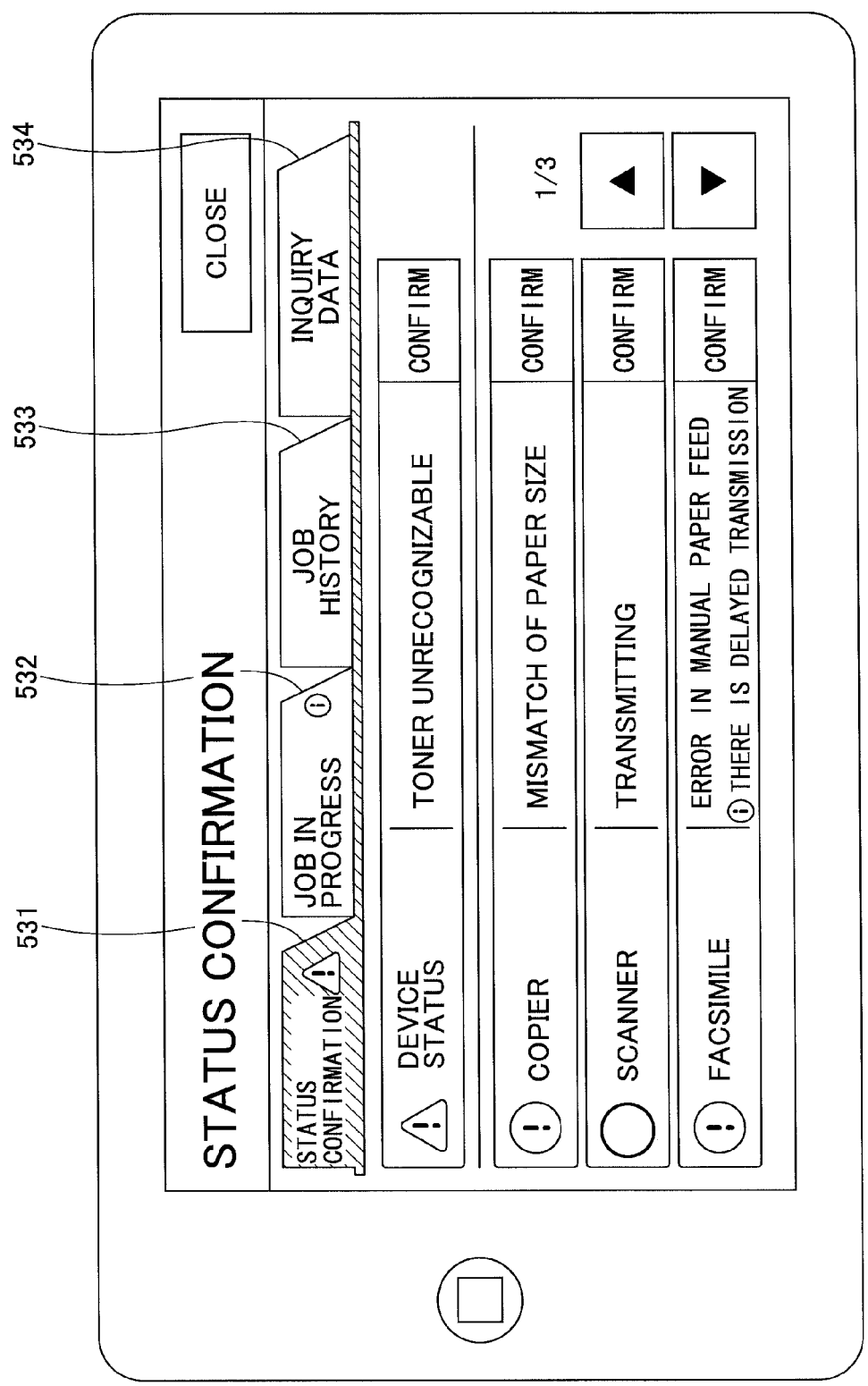
FIG. 14 is an example of a system status screen according to an embodiment of the present invention.
Figure 15:
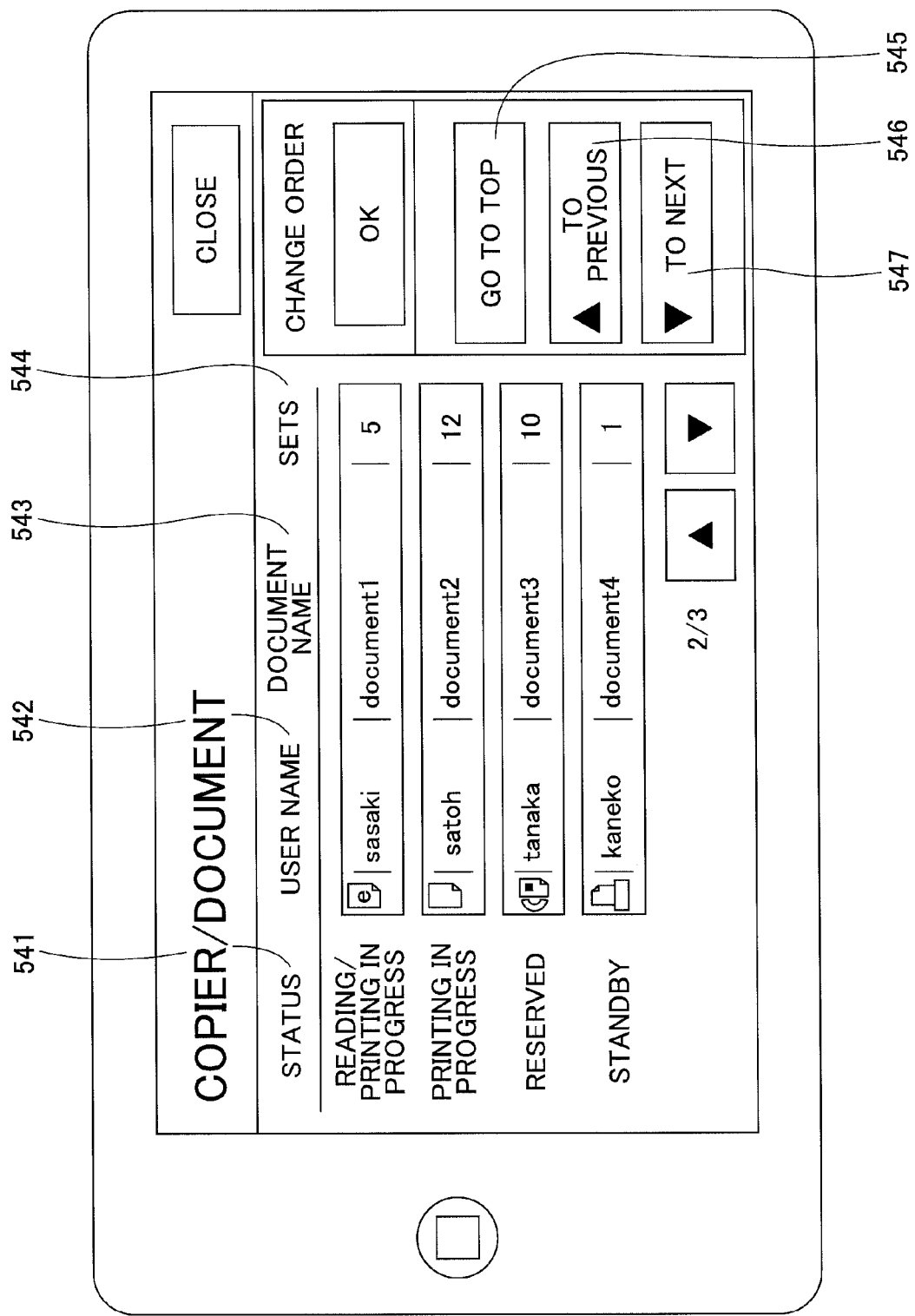
FIG. 15 is an example of a job status confirmation screen according to an embodiment of the present invention.

FIGS. 13-15 are schematic diagrams illustrating examples of a screen in a case where the distance between the portable terminal 300 and the image forming apparatus 100 is long (far) according to an embodiment of the present invention. FIG. 13 is an example of a device status screen. FIG. 14 is an example of a system status screen. FIG. 15 is an example of a job status confirmation screen.

In a case where the distance between the image forming apparatus 100 and the portable terminal 300 is long (far), the user generally desires to confirm the status of the image forming apparatus 100 or confirm the status of execution of a job registered in the image forming apparatus 100. Therefore, the portable terminal 300 displays screens that allow the user to confirm such statuses. In the device status screen of FIG.

13, only an item "Status" 521 and an item "Toner" 522 are displayed. However, the remaining part of the status screen can be displayed by sliding a scroll bar 523 or by dragging the screen. The item "Status" further includes items corresponding to "System", "Copier", and "Scanner". In the example of FIG. 13, the item "System" is indicated as "Status OK", and the items "Copier" and "Scanner" are indicated as "Ready", respectively. Therefore, the items in the example of FIG. 13 shows that no abnormalities are found for the items "System", "Copier", and "Scanner". The item "Toner" further includes items corresponding to "Black", "Cyan", "Magenta". The length of a bar displayed next to each color indicates the remaining amount of toner of each color.

Accordingly, in a case where the distance between the image forming apparatus 100 and the portable terminal 300 is long (far), the device status screen can be displayed on the portable terminal 300. The device status screen is substantially the same screen as the screen displayed by a browser of the PC 200 that receives screen configuration data from the network server 121 of the image forming apparatus 100. Accordingly, the user can view a screen that is substantially the same screen as the screen displayed on the PC 200 with the portable terminal 300.

The system status screen of FIG. 14 displays selectable tabs including, for example, a tab "status confirmation" 531, a tab "job in progress" 532, a tab "job history" 533, and a tab "inquiry data" 534. In the example of FIG. 14, the tab "status confirmation" 531 is selected. Accordingly, the statuses of a device (image forming apparatus), a copier, a scanner, and a facsimile are indicated in corresponding items "device status", "copier", "scanner", and "facsimile", respectively. More specifically, the "device status" is indicated as "toner unrecognizable", the "copier" is indicated as "mismatch of paper size", the "scanner" is indicated as "transmitting (transmission in progress)", and the "facsimile" is indicated as "error in manual paper feed".

Accordingly, in a case where the distance between the image forming apparatus 100 and the portable terminal 300 is long (far), the system status screen can be displayed on the portable terminal 300. The system status screen is substantially the same screen as the screen displayed by a browser of the PC 200 that receives screen configuration data from the network server 121 of the image forming apparatus 100. Accordingly, the user can view a screen that is substantially the same screen as the screen displayed on the PC 200 with the portable terminal 300.

The job status confirmation screen of FIG. 15 displays items in correspondence with each job. More specifically, the job status confirmation screen of FIG. 15 displays an item "status" 541, an item "user name" 542, an item "document name" 543, and an item "sets" 544. The item "status" 541 further includes items such as "reading/printing in progress", "printing in progress", "reserved", and "standby". Thereby, the user can recognize the status of each job. Further, the user can change the order of executing jobs. For example, the user selects the job whose order is to be changed by tapping (pressing) a corresponding button. More specifically, the user changes the order by tapping a button "go to top" 545, a button "to previous" 546, or a button "to next".

Accordingly, in a case where the distance between the image forming apparatus 100 and the portable terminal 300 is long (far), the job status confirmation screen can be displayed on the portable terminal 300. The job status confirmation screen is substantially the same screen as the screen displayed by a browser of the PC 200 that receives screen configuration data from the network server 121 of the image forming apparatus 100. Accordingly, the user can view a screen that is substantially the same screen as the screen displayed on the PC 200 with the portable terminal 300. Thus, the user can use the user's portable terminal 300 to confirm the status of a job reserved in the image forming apparatus 100 by the user. Further, the user can use the user's portable terminal 300 to change the status (order) of a job reserved in the image forming apparatus 100 by the user.

Hence, with the above-described embodiment of the present invention, a screen to be provided from the image forming apparatus 100 to the portable terminal 300 can be controlled in correspondence with the distance between the image forming apparatus 100 and the portable terminal 300. Therefore, regardless of the situation (occasion) of the user, the user can operate the image forming apparatus 100 by using a single portable terminal 300 without complicating the system for operating the image forming apparatus 100. Accordingly, the user can easily perform a desired operation on a screen determined (predicted) to be suitable for the user's situation based on the distance between the user and the image forming apparatus 100.

The present invention is not limited to the specifically disclosed embodiments, and variations and modifications may be made without departing from the scope of the present invention.

The present application is based on and claims the benefit of priority of Japanese Priority Application No. 2012-133231 filed on Jun. 12, 2012, the entire contents of which are hereby incorporated by reference.

What is claimed is:

1. An image processing apparatus for executing a job set thereto, the image processing apparatus comprising:
   one or more processors that perform information processing; and
   one or more memories that store one or more programs to be executed by the one or more processors,
   said one or more programs including instructions for:
   communicating with a portable terminal via a wireless network;
   estimating a distance between the image processing apparatus and the portable terminal;
   determining a screen to be displayed on the portable terminal according to the distance estimated;
   generating a first screen configuration data that constitute the screen determined; and
   controlling execution of the job based on a setting condition received from the portable terminal via the wireless network.

2. The image processing apparatus as claimed in claim 1, further comprising:
   a screen determination table including a first identification data of a first screen registered in correspondence with a first distance and a second identification data of a second screen registered in correspondence with a second distance;
   wherein the determining determines whether the first screen or the second screen is to be displayed on the portable terminal by referring to the screen determination table,
   wherein the first screen is a screen displayed on the image processing apparatus for receiving input that instructs the execution of the job,
   wherein the first distance is less than a predetermined threshold,
   wherein the second screen is a screen that displays a status of the image processing apparatus, and
   wherein the second distance is greater than or equal to the predetermined threshold.

3. The image processing apparatus as claimed in claim 2, wherein in a case where the estimating estimates that the distance between the image processing apparatus and the portable terminal is less than the predetermined threshold, the determining determines that the screen to be displayed on the portable terminal is a screen for receiving input of settings of the job or a screen for receiving input of selections of one of a copying job, a scanning job, or a job to be performed on a stored document.

4. The image processing apparatus as claimed in claim 2, wherein in a case where the estimating estimates that the distance between the image processing apparatus and the portable terminal is greater than or equal to the predetermined threshold, the determining determines that the screen to be displayed on the portable terminal is a screen for displaying a remaining amount of consumable supplies, a screen for displaying whether a part of the image processing apparatus is operational, or a screen for displaying a status of a registered job.

5. The image processing apparatus as claimed in claim 2, wherein the first and second identification data of the first and second screens are registered in correspondence with a user identification data assigned to each user.

6. The image processing apparatus as claimed in claim 1, further comprising an operation panel;
wherein a screen displayed on the operation panel is substantially the same as the screen to be displayed on the portable terminal based on the first screen configuration data when the distance estimated by the distance estimation unit is less than a predetermined threshold.

7. The image processing apparatus as claimed in claim 1, wherein the one or more programs further includes an instruction for transmitting a second screen configuration data that constitutes a screen to be displayed on the image processing apparatus in a case where wired communication with another data processing apparatus is performed;
wherein the screen displayed on the portable terminal is substantially the same as the screen constituted by the second screen configuration data in a case where the distance estimated is greater than or equal to a predetermined threshold.

8. A method for providing screen data of an image processing apparatus that executes a job set thereto and includes one or more processors, the method comprising the steps of:
performing, by the one or more processors, wireless communication with a portable terminal;
estimating, by the one or more processors, a distance between the image processing apparatus and the portable terminal;
determining, by the one or more processors, a screen to be displayed on the portable terminal according to the distance estimated by the distance estimation unit;
generating, by the one or more processors, a screen configuration data that constitute the screen determined by the screen determination unit; and
controlling, by the one or more processors, execution of the job based on a setting condition received from the portable terminal.

9. A non-transitory computer-readable recording medium on which a program is recorded for causing a computer to execute a method for providing screen data of an image processing apparatus that executes a job set thereto and includes one or more processors, the method comprising the steps of:
performing, by the one or more processors, wireless communication with a portable terminal;
estimating, by the one or more processors, a distance between the image processing apparatus and the portable terminal;
determining, by the one or more processors, a screen to be displayed on the portable terminal according to the distance estimated by the distance estimation unit;
generating, by the one or more processors, a screen configuration data that constitute the screen determined by the screen determination unit; and
controlling, by the one or more processors, execution of the job based on a setting condition received from the portable terminal.

* * * * *